(12) United States Patent
Wuidart

(10) Patent No.: US 6,960,985 B2
(45) Date of Patent: Nov. 1, 2005

(54) ADAPTATION OF THE TRANSMISSION POWER OF AN ELECTROMAGNETIC TRANSPONDER READER

(75) Inventor: Luc Wuidart, Pourrieres (FR)

(73) Assignee: STMicroelectronics S.A., Gentilly (FR)

( * ) Notice: Subject to any disclaimer, the term of this patent is extended or adjusted under 35 U.S.C. 154(b) by 819 days.

(21) Appl. No.: 09/770,783

(22) Filed: Jan. 26, 2001

(65) Prior Publication Data

US 2001/0015697 A1 Aug. 23, 2001

(30) Foreign Application Priority Data

Jan. 31, 2000 (FR) .............................................. 00 01214

(51) Int. Cl.$^7$ ................................................ H04Q 1/00
(52) U.S. Cl. ................................ 340/10.34; 340/10.3
(58) Field of Search ............................ 340/10.34, 10.3, 340/10.4

(56) References Cited

U.S. PATENT DOCUMENTS

| | | | |
|---|---|---|---|
| 2,411,555 A | 11/1946 | Rogers | |
| 3,618,089 A | 11/1971 | Moran, Jr. et al. | |
| 4,068,232 A | 1/1978 | Meyers et al. | |

(Continued)

FOREIGN PATENT DOCUMENTS

| | | | | |
|---|---|---|---|---|
| DE | 28 35 549 A1 | 3/1979 | | |
| DE | 44 44 984 | 12/1994 | | |
| DE | 195 46 928 | 6/1997 | | |
| DE | 196 21 076 | 11/1997 | | |
| DE | 196 32 282 A1 | 2/1998 | | |
| EP | 0 038 877 | 11/1981 | | |
| EP | 0 369 622 | 5/1990 | | |
| EP | 0 568 067 A | 11/1993 | | |
| EP | 0 579 332 A1 | 1/1994 | | |
| EP | 0 645 840 A | 3/1995 | | |
| EP | 0 768 540 | 4/1997 | | |
| EP | 0 857 981 A1 | 8/1998 | ........... | G01S/13/00 |
| EP | 0 902 475 A | 3/1999 | | |
| FR | 2 114 026 | 6/1972 | | |
| FR | 2 746 200 | 9/1997 | | |
| FR | 2 757 952 | 7/1998 | | |
| GB | 2 298 553 A | 9/1996 | | |
| GB | 2 321 726 A1 | 8/1998 | | |
| JP | 407245946 A | 9/1995 | | |
| JP | 10-145267 | 5/1998 | | |
| JP | 10-203066 | 8/1998 | | |
| WO | WO 93/17482 | 9/1993 | | |
| WO | WO 98/20363 | 5/1998 | | |
| WO | WO 99/33017 | 7/1999 | | |
| WO | WO 99/43096 | 8/1999 | ............ | H04B/1/59 |

OTHER PUBLICATIONS

French Search Report from French Patent Application No. 99 09563, filed Jul. 20, 1999.
French Search Report from French Patent Application No. 99 08025, filed Jun. 22, 1998.
French Search Report from French Patent Application No. 99 04547, filed Apr. 7, 1999.

(Continued)

*Primary Examiner*—Brian Zimmerman
(74) *Attorney, Agent, or Firm*—Lisa K. Jorgenson; James H. Morris; Wolf, Greenfield & Sacks, P.C.

(57) ABSTRACT

A terminal for generating an electromagnetic field adapted to cooperating with at least one transponder when the latter enters its field and including an oscillating circuit adapted to receiving a high-frequency A.C. excitation voltage, circuitry for regulating the signal phase in the oscillating circuit with respect to a reference value, circuitry for determining an instantaneous information relative to the magnetic coupling between the transponder and the terminal, and circuitry for adapting the electromagnetic field power according to at least said present information.

36 Claims, 3 Drawing Sheets

U.S. PATENT DOCUMENTS

| | | | |
|---|---|---|---|
| 4,209,783 A | 6/1980 | Ohyama et al. | |
| 4,258,348 A | 3/1981 | Belfer et al. | |
| 4,278,977 A | 7/1981 | Nossen | |
| 4,375,289 A | 3/1983 | Schmall et al. | |
| 4,408,185 A | 10/1983 | Rasmussen | |
| 4,593,412 A | 6/1986 | Jacob | |
| 4,656,472 A | 4/1987 | Walton | |
| 4,660,192 A | 4/1987 | Pomatto, Sr. | |
| 4,673,932 A | 6/1987 | Ekchian et al. | |
| 4,706,050 A | 11/1987 | Andrews | |
| 4,782,308 A | 11/1988 | Trobec et al. | |
| 4,802,080 A | 1/1989 | Bossi et al. | |
| 4,814,595 A | 3/1989 | Gilboa | |
| 4,827,266 A | 5/1989 | Sato et al. | |
| 4,928,108 A | 5/1990 | Kropielnicki et al. | |
| 4,963,887 A | 10/1990 | Kawashima et al. | |
| 5,013,898 A | 5/1991 | Glasspool | |
| 5,055,853 A | 10/1991 | Garnier | |
| 5,084,699 A | 1/1992 | DeMichele | |
| 5,099,227 A | 3/1992 | Geiszler et al. | |
| 5,126,749 A | 6/1992 | Kaltner | |
| 5,142,292 A | 8/1992 | Chang | |
| 5,202,644 A | 4/1993 | Brady | |
| 5,214,409 A | 5/1993 | Beigel | |
| 5,235,326 A | 8/1993 | Beigel et al. | |
| 5,305,008 A | 4/1994 | Turner et al. | |
| 5,324,315 A | 6/1994 | Grevious | |
| 5,541,958 A | 7/1995 | Schuermann | |
| 5,452,344 A | 9/1995 | Larson | |
| 5,493,267 A | 2/1996 | Ahlse et al. | |
| 5,504,485 A | 4/1996 | Landt et al. | |
| 5,519,381 A | 5/1996 | Marsh et al. | |
| 5,521,602 A | 5/1996 | Carroll et al. | |
| 5,541,604 A | 7/1996 | Meier | |
| 5,550,536 A | 8/1996 | Flaxl | |
| 5,604,411 A | 2/1997 | Venkitasubrahmanian et al. | |
| 5,619,529 A | 4/1997 | Fujioka | |
| 5,621,411 A | 4/1997 | Hagl et al. | |
| 5,691,605 A | 11/1997 | Xia et al. | |
| 5,698,837 A | 12/1997 | Furuta | |
| 5,698,838 A | 12/1997 | Yamaguchi | |
| 5,701,121 A * | 12/1997 | Murdoch | 340/10.34 |
| 5,703,573 A | 12/1997 | Fujimoto et al. | 340/825 |
| 5,767,503 A | 6/1998 | Gloton | |
| 5,801,372 A | 9/1998 | Yamaguchi | |
| 5,831,257 A | 11/1998 | Yamaguchi | |
| 5,850,416 A | 12/1998 | Myer | |
| 5,874,725 A | 2/1999 | Yamaguchi | |
| 5,883,582 A | 3/1999 | Bowers et al. | |
| 5,889,273 A | 3/1999 | Goto | |
| 5,905,444 A | 5/1999 | Zimmer | |
| 5,955,950 A | 9/1999 | Gallagher, III et al. | |
| 6,014,088 A | 1/2000 | Van Santbrink et al. | |
| 6,025,780 A | 2/2000 | Bowers et al. | |
| 6,028,503 A | 2/2000 | Preishuberpflugl et al. | |
| 6,034,640 A | 3/2000 | Oida et al. | |
| 6,070,803 A | 6/2000 | Stobbe | |
| 6,070,804 A | 6/2000 | Miyamoto | |
| 6,072,383 A | 6/2000 | Gallagher, III et al. | |
| 6,075,491 A | 6/2000 | Dakeya et al. | |
| 6,100,788 A | 8/2000 | Frary | |
| 6,137,411 A | 10/2000 | Tyren | |
| 6,150,986 A | 11/2000 | Sandberg et al. | |
| 6,154,635 A | 11/2000 | Ohta | |
| 6,172,608 B1 | 1/2001 | Cole | |
| 6,208,235 B1 | 3/2001 | Trontelj | |
| 6,229,443 B1 | 5/2001 | Roesner | |
| 6,243,013 B1 | 6/2001 | Duan et al. | |
| 6,265,962 B1 | 7/2001 | Black et al. | |
| 6,272,320 B1 | 8/2001 | Nandra et al. | |
| 6,272,321 B1 | 8/2001 | Bruhnke et al. | |
| 6,281,794 B1 | 8/2001 | Duan et al. | |
| 6,304,169 B1 | 10/2001 | Blama et al. | |
| 6,307,468 B1 | 10/2001 | Ward, Jr. | |
| 6,307,517 B1 | 10/2001 | Lee | |
| 6,335,665 B1 | 1/2002 | Mendelsohn | |
| 6,356,738 B1 | 3/2002 | Schneider et al. | |
| 6,393,045 B1 | 5/2002 | Belcher et al. | |
| 6,424,820 B1 | 7/2002 | Burdick et al. | |
| 6,441,804 B1 | 8/2002 | Hsien | |
| 6,446,049 B1 | 9/2002 | Janning et al. | |
| 6,491,230 B1 | 12/2002 | Dubost et al. | |
| 6,498,923 B2 | 12/2002 | Ikefuji et al. | |
| 6,617,962 B1 | 9/2003 | Horwitz et al. | |
| 6,646,543 B1 | 11/2003 | Mardinian et al. | |
| 6,650,226 B1 | 11/2003 | Wuidart et al. | |
| 6,650,227 B1 | 11/2003 | Bradin | |
| 6,650,229 B1 | 11/2003 | Wuidart et al. | |
| 6,654,466 B1 | 11/2003 | Ikefuji et al. | |
| 6,690,229 B2 | 2/2004 | Rudolph | |
| 6,703,921 B1 | 3/2004 | Wuidart et al. | |
| 2002/0008611 A1 | 1/2002 | Wuidart | |
| 2003/0227323 A1 | 12/2003 | Enguent | |

OTHER PUBLICATIONS

French Search Report from French Patent Application No. 99 04546, filed Apr. 7, 1999.

French Search Report from French Patent Application No. 98 08024, filed Jun. 22, 1998.

French Search Report from French Patent Application No. 99 04548, filed Apr. 7, 1999.

French Search Report from French Patent Application No. 99 04544, filed Apr. 7, 1999.

French Search Report from French Patent Application No. 00/01214, filed Jan. 31, 2000.

French Search Report from French Patent Application No. 99 0956, filed Jul. 20, 1999.

French Search Report from French Patent Application No. 00/06301, filed May 17, 2000.

French Search Report from French Patent Application No. 99 04548 filed Apr. 7, 1999.

French Search Report from French Patent Application No. 99 04545, filed Apr. 7, 1999.

French Search Report from French Patent Application No. 99 07024, filed May 31, 1999.

French Search Report from French Patent Application No. 00 06302, filed May 17, 2000.

French Search Report from French Patent Application No. 00 06065, filed May 12, 2000.

French Search Report from French Patent Applciation No. 00 06061, filed May 12, 2000.

French Search Report from French Patent Application No. 00 06064, filed May 12, 2000.

French Search Report from French Patent Application No. 00 06071, filed May 12, 2000.

French Search Report from French Patent Application No. 99 04549, filed Apr. 7, 1999.

* cited by examiner

ADAPTATION OF THE TRANSMISSION POWER OF AN ELECTROMAGNETIC TRANSPONDER READER

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read and/or write terminal. The present invention more specifically relates to a reader intended for transponders having no independent power supply. Such transponders extract the power supply required by the electronic circuits included therein from the high frequency field radiated by an antenna of the read/write terminal. The present invention applies to a terminal only reading the data of a read-only transponder as well as to a read/write terminal adapted to modifying data contained in the transponder.

The present invention more specifically relates to the adaptation of the transmission power of a read/write terminal as a function of the distance from the transponder to the terminal.

2. Discussion of the Related Art

Systems using electromagnetic transponders are based on the use of oscillating circuits including a winding forming an antenna, on the transponder side and on the read/write terminal side. These circuits are intended to be coupled by a close magnetic field when the transponder enters the field of the read/write terminal.

FIG. 1 very schematically shows, in a simplified way, a conventional example of a data exchange system between a read/write terminal 1 and a transponder 10 of the type to which the present invention applies.

Generally, terminal 1 is formed of a series oscillating circuit, formed of an inductance L1 in series with a capacitor C1 and a resistor R1, between an output terminal 2 of an amplifier or antenna coupler (not shown) and a reference terminal 3 (generally, the ground). The antenna coupler belongs to a circuit 4 for controlling the oscillating circuit and exploiting received data including, among others, a modulator-demodulator and a microprocessor for processing the control signals and the data. In the example shown in FIG. 1, node 5 of connection of capacitor C1 with inductance L1 forms a terminal for sampling a data signal received for the demodulator. Circuit 4 of the terminal generally communicates with different input/output circuits (keyboard, screen, means of transmission to a provider, etc.) and/or processing circuits, not shown. The circuits of the read/write terminal draw the power required by their operation from a supply circuit (not shown) connected, for example, to the electric supply system.

A transponder 10, intended for cooperating with a terminal 1, includes an inductance L2, in parallel with a capacitor C2 between two input terminals 11, 12 of a control and processing circuit 13. Terminals 11, 12 are in practice connected to the input of a rectifying means (not shown), the outputs of which define D.C. supply terminals of the circuits internal to the transponder.

The oscillating circuit of terminal 1 is excited by a high-frequency signal (for example, at 13.56 MHz) which, in the absence of any data transmission from the terminal to the transponder, is exclusively used as a power source for the latter. When a transponder 10 is in the field of terminal 1, a high-frequency voltage is generated across terminals 11, 12 of the transponder's resonant circuit. This voltage, after being rectified and possibly clipped, is intended to provide the supply voltage for electronic circuits 13 of the transponder. These circuits generally include a microprocessor, a memory, a demodulator of the signals possibly received from terminal 1, and a modulator for transmitting information to the terminal.

The oscillating circuits of the terminal and of the transponder are generally tuned on the frequency of a transmission carrier, that is, the resonance frequency is set on a frequency of, for example, 13.56 MHz. This tuning aims at maximizing the energy diffusion to the transponder, generally, a card of credit card size integrating the different transponder components.

The high-frequency remote supply carrier transmitted by terminal 1 is also used as a data transmission carrier. This carrier is generally amplitude modulated by the terminal according to various coding techniques to transmit the data to the transponder. In return, the data transmission from the transponder to the terminal is generally performed by modulating the load formed by resonant circuit L2, C2. This load variation is performed at the rate of a sub-carrier having a frequency (for example, 847.5 kHz) smaller than that of the carrier. This load variation can then be detected by the terminal in the form of an amplitude variation or of a phase variation by means, for example, of a measurement of the voltage across capacitor C1 or of the current in the oscillating circuit. The data transmission, be it from the terminal to the transponder or from the transponder to the terminal, uses well known techniques that will not be detailed any further. It should only be noted that these data transmissions use, as a transmission carrier, the high-frequency transponder remote supply signal, even if the data transmitted by the terminal are modulated on a sub-carrier.

The voltage sensed by transponder 10 in the field of a terminal 1 depends on the distance separating the transponder from the terminal and, more specifically, on the coupling coefficient between the respective oscillating circuits of the terminal and of the transponder. To have a system with a relatively wide range (on the order of 4 to 8 inches), significant power has to be provided to the oscillating circuits of the terminal so that the radiated magnetic field remains sufficiently intense at the desired range distance to provide the necessary remote supply power to the transponder. However, this has the disadvantage that, when a transponder is close to the terminal, it receives too much power as compared to its needs. In addition to the fact that this requires providing means of protection against overvoltages on the transponder side, this causes a useless power overconsumption by the read/write terminal.

Another problem resulting from the high power radiated by the terminal is that several transponders can receive a sufficient power from this radiated magnetic field, which can pose problems of conflict in the data transmissions and/or can result in an unauthorized pirating of the data transmissions between a transponder and a read/write terminal.

SUMMARY OF THE INVENTION

An object of the present invention is to overcome the disadvantages of conventional electromagnetic transponder systems, linked to the high power radiated by a read/write terminal.

More specifically, the present invention aims at optimizing the power consumption of an electromagnetic transponder read/write terminal.

The present invention also aims at providing a solution that requires no modification of the transponder and that is accordingly compatible with existing transponders.

The present invention provides adapting the transmission power of the read/write terminal according to the distance of the transponder that has entered its field. Thus, according to the present invention, the power transmitted by the terminal is modulated according to whether the transponder is closer or further away therefrom.

Document EP-A-0,722,094 provides such an adaptation of the excitation power of the oscillating circuit of a reader according to the distance from a transponder and more specifically, to the magnetic coupling between the transponder and the reader. The solution advocated by this document consists of determining the coupling based on the voltage across the reader's oscillating circuit, and of then accordingly adapting the reader's output level.

Such a solution is not satisfactory for several reasons.

First, the voltage recovered by the transponder (the power drawn from the field radiated by the read/write terminal) is not a monotonous function of the distance. In particular, for a given type of transponder, characterized by the impedance of its oscillating circuit, the characteristic of the voltage across this oscillating circuit according to the coupling (or to the distance) generally has a maximum at an optimal coupling position. Accordingly, the same voltage level can be sensed by the transponder for two different distances.

Further, this voltage coupling characteristic varies according to the tuning of the oscillating circuits (and thus to their resonance frequency), that is, it also depends on the impedance of the terminal's oscillating circuit.

It should be noted that, on the reader side, the current in the oscillating circuit is a function, in particular, of the voltage recovered by the transponder and of the coupling coefficient.

The problems due to the non-monotonous shape of the voltage recovered by the transponder according to the coupling are not solved by above-mentioned document EP-A-0,722,094.

Another problem is that the same terminal is likely to be used with different families of transponders that differentiate, in particular, by the sizing of their components. Accordingly, the control relations must be provided for a given transponder type and be modified each time this transponder type changes. This may be the case, for example, if a new transponder version replaces an old version in an access control system.

The present invention aims at providing an adaptation of the power transmitted by the terminal for a transponder without it being necessary to perform a transmission from the transponder to evaluate the distance separating it from the terminal.

The present invention also aims at making this adaptation reliable, even for a non-monotonous response of the transponder according to distance.

The present invention also aims at enabling an automatic parameterizing of the terminal to prepare it to a transponder type.

More specifically, the present invention provides a terminal for generating an electromagnetic field adapted to cooperating with at least one transponder when the latter enters this field and including an oscillating circuit adapted to receiving a high-frequency A.C. excitation voltage, this terminal including:

means for regulating the signal phase in the oscillating circuit with respect to a reference value;

means for determining instantaneous information relative to the magnetic coupling between the transponder and the terminal; and means for adapting the electromagnetic field power according to at least the instantaneous information.

According to an embodiment of the present invention, the terminal includes means for measuring a first quantity which is a function of the voltage across a capacitive element of its oscillating circuit and a second quantity which is a function of the current in its oscillating circuit.

According to an embodiment of the present invention, the terminal includes means for determining and storing characteristic information relative to the coupling in several determined configurations of the distance separating the transponder from the terminal, and for taking account of this characteristic information in the field power adaptation according to the instantaneous information.

According to an embodiment of the present invention, said characteristic information includes, among others:

the voltage across the capacitive element when no transponder is present in the field of the terminal;

the voltage across the capacitive element when a transponder is in a relation of maximum closeness with the terminal;

the current in the oscillating circuit when no transponder is present in the field of the terminal; and the current in the oscillating circuit when a transponder is in a relation of maximum closeness with the terminal.

According to an embodiment of the present invention, the instantaneous information is deduced from the instantaneous measurement of said two quantities and of the values of said characteristic information.

According to an embodiment of the present invention, at least one characteristic information is automatically determined by the terminal in a learning phase.

According to an embodiment of the present invention, the means for adapting the power of the electromagnetic field include means controllable to modify the A.C. excitation voltage of the oscillating circuit of the terminal.

According to an embodiment of the present invention, the means for adapting the power of the electromagnetic field include one or several controllable resistive elements, belonging to the oscillating circuit of the terminal.

According to an embodiment of the present invention, the response time of the phase regulation means is chosen to be large as compared to the frequency of a possible back-modulation coming from a transponder present in the electromagnetic field of the terminal and to be fast as compared to the displacement speed of a transponder in this electromagnetic field.

According to an embodiment of the present invention, said oscillating circuit includes an element of variable capacitance, said terminal including means adapted to determining the value of this capacitance based on a phase measurement on the signal in the oscillating circuit by varying the voltage across the element of variable capacitance.

The present invention also provides a method for controlling a terminal, including the steps of:

a) in a learning phase:

determining a first characteristic information associated with the current in the oscillating circuit when no transponder is present in the field of the terminal;

determining a second characteristic information associated with the current in the oscillating circuit when a transponder is in a relation of maximum closeness with the terminal;

calculating linear relations of control of the magnetic field power according to the instantaneous information and to a predetermined nominal value; and b) in operation:

determining the instantaneous information associated with the coupling between a transponder that has entered the terminal's field and said terminal; and adapting the magnetic field power based on said linear relations.

According to an embodiment of the present invention, said instantaneous information is a function of the ratio between the instantaneous magnetic coupling coefficient and the maximum magnetic coupling coefficient obtained when a transponder is in a relation of maximum closeness with the terminal.

The foregoing objects, features and advantages of the present invention, will be discussed in detail in the following non-limiting description of specific embodiments in connection with the accompanying drawings.

DETAILED DESCRIPTION

Figure 1:
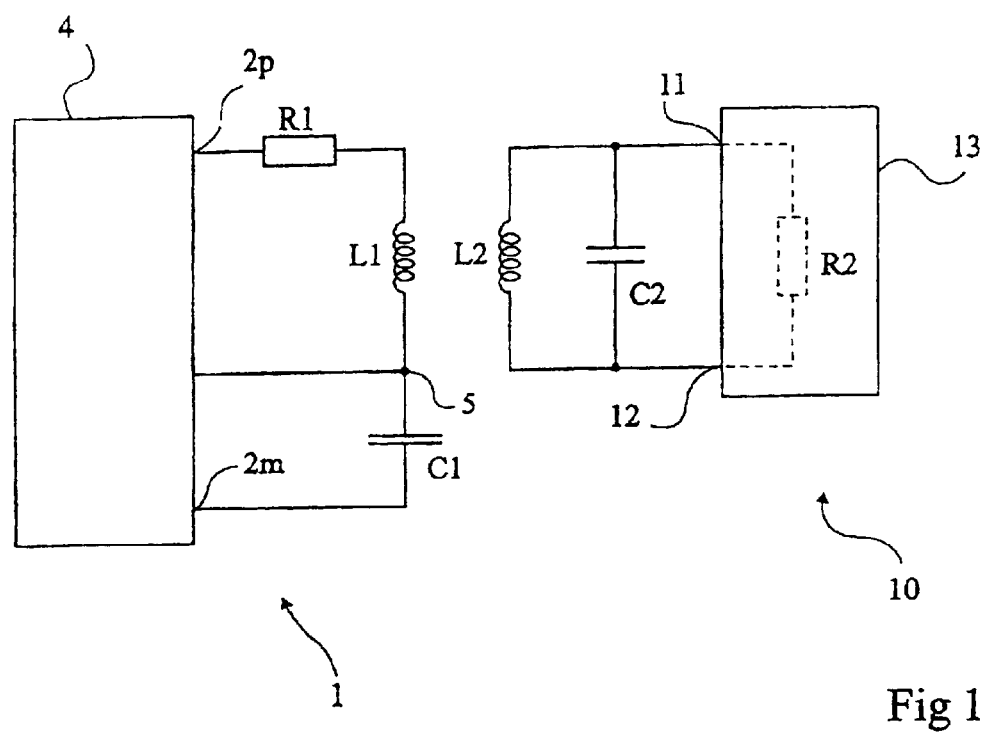
FIG. 1 very schematically shows an electromagnetic transponder system of the type to which the present invention applies.

The same elements have been referred to with the same references in the different drawings which, especially for FIGS. 3 to 6, have been drawn out of scale. For clarity, only those elements necessary to the understanding of the present invention have been shown in the drawings and will be described hereafter. In particular, the structure of a transponder and the structure of the digital data processing elements on the read terminal side have not been detailed.

A feature of the present invention is to modify the excitation energy of the oscillating circuit of a read/write terminal according to the distance of a transponder that has entered the terminal's field, evaluated by means of the signal at the remote supply carrier frequency. The fact of directly using the remote supply carrier information enables evaluating the distance without it being necessary for the transponder to transmit information. Indeed, when it enters the field of a terminal, a transponder acts upon the load of the oscillating circuit of this terminal. This load variation depends, in particular, on the distance that separates the transponder from the terminal. The power modification is performed, according to the present invention, by acting upon the current in the series oscillating circuit, that is, in the terminal antenna (inductance L1). This action can be performed either by modifying the so-called generator voltage, that is, the output voltage of amplifier 3, or by modifying the value of resistance R1.

To obtain the distance information, a solution of the present invention is to measure, among others, the signal amplitude (for example, the amplitude of the voltage across capacitor C1, FIG. 1). As indicated previously, such a measurement is unexploitable in practice with a conventional terminal, especially since the range of voltage variation according to distance depends on the tuning of the oscillating circuit, and thus on the value of capacitance C1. Now, in conventional circuits, the tuning is never perfect.

In particular, in conventional terminals, the tuning of the resonance frequency to the carrier frequency is performed manually by means of a variable capacitor, once the terminal has been manufactured. The tuning needs adjusting, especially due to the manufacturing tolerances of the capacitive and inductive elements, to guarantee the phase operating point chosen between a reference signal provided by an oscillator of the terminal and the received signal sampled, for example, across capacitor C1. A detuning of the terminal's oscillating circuit has several consequences and, in particular, that of modifying the signal amplitude in this oscillating circuit and, accordingly, the available signal amplitude for a possible evaluation.

Thus, another feature of the present invention is to provide a regulation of the terminal's oscillating circuit phase with respect to a reference value. According to the present invention, this phase regulation is performed by means of a loop, the response time of which is chosen for the loop to be sufficiently slow to avoid disturbing the back-modulation coming from a transponder and to be sufficiently fast as compared to the displacement speed of a transponder in the terminal field. This can be called a static regulation with respect to the modulation frequencies (for example, the 13.56-MHz remote supply carrier frequency and the 847.5 kHz back-modulation frequency used in the data transmission from the transponder to the terminal).

Figure 2:
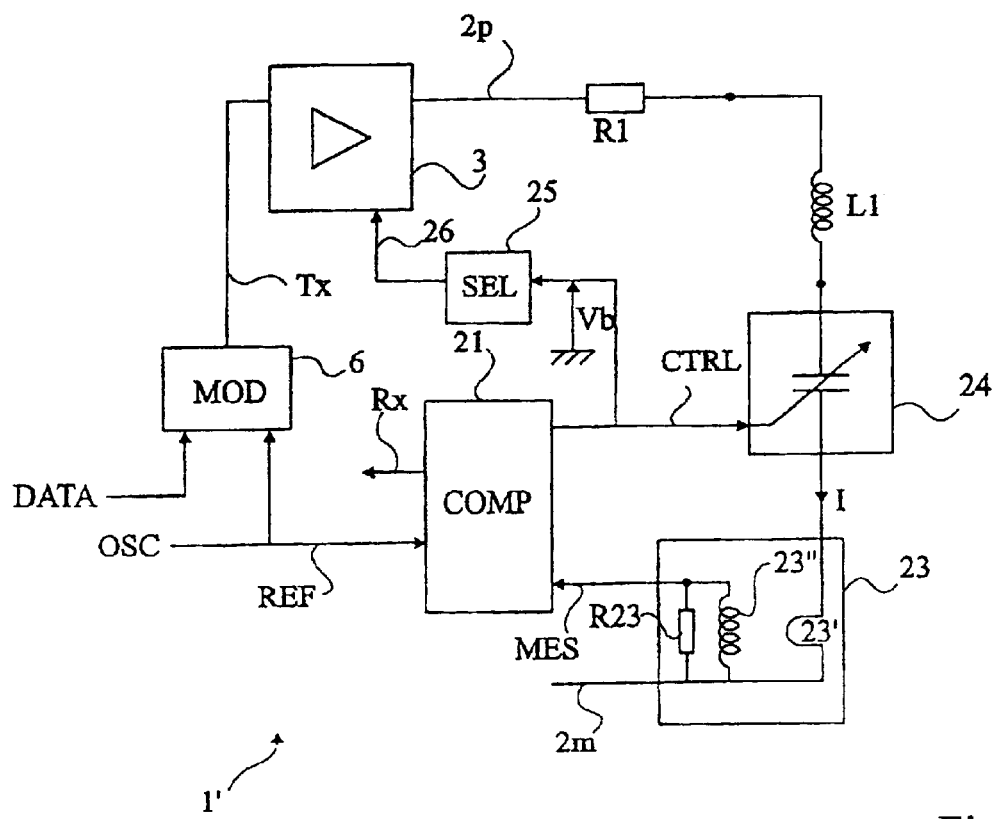
FIG. 2 shows, in the form of blocks, an embodiment of a terminal of an electromagnetic transponder system according to the present invention.

FIG. 2 shows, in the form of blocks, an embodiment of a terminal 1' according to the present invention, equipped with an oscillating circuit phase regulation loop.

Conventionally, terminal 1' includes an oscillating circuit formed of an inductance or antenna L1, in series with a capacitive element 24 and a resistive element (symbolized by a resistor R1), between an output terminal 2p of an amplifier or antenna coupler 3 and a terminal 2m at a reference potential (generally the ground). Amplifier 3 receives a high frequency transmission signal Tx coming from a modulator 6 (MOD) that receives a reference frequency (signal OSC), for example, from a quartz oscillator (not shown). Modulator 4 receives, if necessary, a data signal to be transmitted and, in the absence of any data transmission from the terminal, provides the high-frequency carrier (for example, at 13.56 MHz) adapted to remotely supplying a transponder.

A feature of the present invention is that capacitive element 24 is an element with a variable capacitance, controllable by at least one signal CTRL. According to the present invention, a regulation of the phase of the current in antenna L1 with respect to a reference signal REF is performed. This regulation is a regulation of the high-frequency signal, that is, of the signal of the carrier corresponding to signal Tx in the absence of data to be transmitted. This regulation is performed by varying the capacitance of the oscillating circuit of terminal 1' to maintain the current in the antenna in a constant phase relation with the reference signal. Signal REF is at the carrier frequency and corresponds, for example, to signal OSC provided by the oscillator of the modulator.

The variable capacitor can be obtained in several manners. Generally, this capacitance must reach a few hundreds of picofarads and withstand, across its terminals, a voltage of more than 100 volts. A first solution is to use a network of switched capacitors. However, a disadvantage then is that, unless designing a bulky circuit due to the number of capacitors, the variation is far from being linear. A second solution is to use a diode of which the capacitance of the reverse-biased junction is used as a variable capacitance which is a function of this biasing. The diode is then connected, by its anode, on the side of reference terminal 2m and, by its cathode, on the side of inductance L1. A third solution is to use a diode-mounted MOSFET transistor. Such a component has substantially the same capacitance-vs.-voltage characteristic as that of a diode. The advantage is that, for a same avalanche voltage withstand, the necessary integration surface area is smaller than for a diode.

As illustrated in FIG. 2, capacitive element 24 provided in series with resistor R1 and inductance L1 is controllable by means of signal CTRL. Signal CTRL comes from a circuit 21 (COMP), the function of which is to detect the phase interval with respect to reference signal REF and to accordingly modify the capacitance of element 24.

The phase measurement in the oscillating circuit is performed, for example, based on a measurement of current I in the oscillating circuit. A circuit 23 formed of a current transformer connected in series with element 24 and inductance L1 is used, for example in the embodiment illustrated in FIG. 2. Such a current transformer is generally formed of a primary winding 23' between element 24 and ground terminal 2m, and of a secondary winding 23", a first terminal of which is directly connected to ground 2m and the other terminal of which provides a signal MES providing the result of the measurement, a current-to-voltage conversion resistor R23 being connected in parallel with secondary winding 23".

Result MES of the measurement is sent to phase comparator 21 that then compares the phase of the current measured by block 23 to reference signal REF, and accordingly controls capacitive element 24 by means of signal CTRL.

According to a preferred embodiment, comparator 21 uses the same phase demodulator (not shown) as that used to demodulate the signal coming from the transponder and which may be received by the oscillating circuit. Accordingly, as illustrated in FIG. 2, comparator 21 provides a signal Rx restituting a possible back-modulation of data received from a transponder.

It should be noted that the phase regulation loop must be sufficiently slow so as not to disturb the phase modulation at 847.5 kHz, but sufficiently fast as compared to the displacement speed of a transponder in the terminal field, which is generally the displacement speed of a hand. For example, a response time on the order of one millisecond is adequate, the displacement time of a transponder being of several hundreds of milliseconds.

A first advantage of the present invention is that, by regulating the phase of the oscillating circuit on a reference value, both the possible problems of sizing tolerances of the oscillating circuit components and of the operating drift thereof are overcome.

According to the present invention, the correction information of the phase regulation loop, that is, an information associated with the voltage across capacitor 24 (in practice associated with transformer 23, the presence of which can be neglected) is used to evaluate the transponder position.

According to an embodiment where capacitive element 24 is voltage-controlled, the correction information is sampled directly at the output of the phase regulator, that is, in the form of the voltage level of signal CTRL. Thus, according to this embodiment, terminal 1' includes a unit 25 (SEL) of selection of the amount of power as a function, among others, of voltage Vb of correction of the phase loop.

According to another embodiment, an element distinct from the phase regulator is used to evaluate the voltage across capacitor 24. The use of the correction information however has the advantage of optimizing the circuit.

In practice, and as will be seen hereafter, the value of current I (as an alternative, a value linked thereto in a known linear manner) in the oscillating circuit of the terminal and the value of voltage VC1 (as an alternative, a value linked thereto in a known linear manner) across capacitor 24 are preferably measured. This enables, in particular, overcoming the problems due to the fact that the transponder response is not monotonous.

In the example of FIG. 2, unit 25 acts upon the generator voltage level with a control signal 26. According to another preferred embodiment, unit 25 acts upon resistive element R1 to modify its value. In this case, a network of switchable resistors or one or several MOSFET transistors, the on-state resistance of which is varied by modifying their gate voltages, are for example used.

Whatever the embodiment, it should be noted that unit 25 preferably acts to substantially linearly modify the transmission power according to the reference value. However, a variation by stages may be used, for example if the resistive element is formed of an array of switchable resistors or if unit 25 performs an analog-to-digital conversion or receives a digital information.

Another feature of the present invention is to provide an automatic parameterizing of the terminal, to adapt the power control on the distance at which a transponder is located according to the type of transponder. This automatic parameterizing is performed in a learning phase and will be better understood after the following discussion of the relation between the coupling of the oscillating circuits and the distance separating them.

Figure 3:
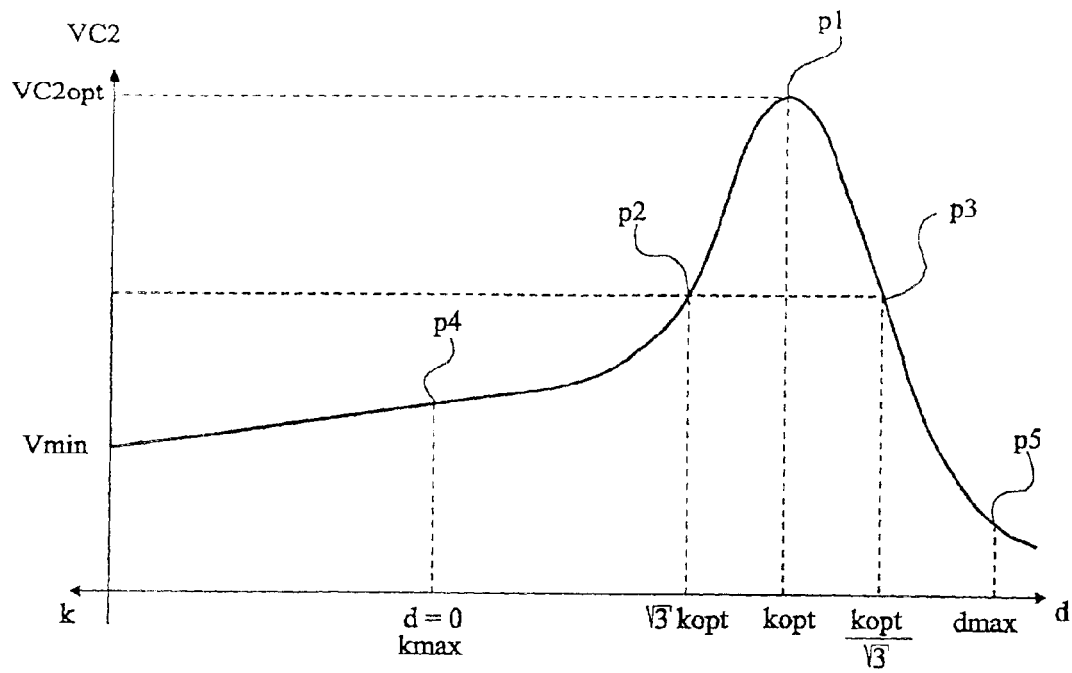
FIG. 3 shows a general example of variation of the voltage across the oscillating circuit of a transponder according to the distance separating it from a terminal.

FIG. 3 shows the variation of voltage VC2 across terminals 11, 12 of a transponder according to distance d separating the transponder from a read/write terminal. The curve of FIG. 3 may also be considered as representing the variation of voltage VC2 according to coupling coefficient k (always included between 0 and 1) between the oscillating circuits of the transponder and of the terminal, as will be shown by formula 5 presented hereafter. Indeed, the coupling between the oscillating circuits is a function of the distance separating the antennas. More specifically, the distance separating the antennas is, as a first approximation, proportional to 1-k. Accordingly, in the following description, reference will be made either to the distance or to the coupling coefficient as the abscissa of the characteristic of FIG. 3. The x-axis represents a distance d increasing towards the right of the drawing and a coupling coefficient k increasing towards the left of the drawing.

As illustrated in FIG. 3, voltage VC2 has a maximum $VC2_{opt}$ for an optimal value of the coupling coefficient $k_{opt}$. For a given frequency and sizing of the oscillating circuits, voltage VC2 decreases on either side of optimal coupling position p1.

The curve exhibits a reversal point p2 for a coupling value of $k_{opt}\sqrt{3}$, that is, for a distance shorter than the optimal coupling position. As for still shorter distances, the curves tends towards an asymptote at a minimum position $V_{min}$. As for distances greater than the optimal coupling position, the decrease of voltage VC2 is stronger. Further, the voltage level (of which it can be shown that it is equal to $VC2_{opt}\sqrt{3}/2$) of inflexion point p2 at $k_{opt}\sqrt{3}$ appears to be located, symmetrically with respect to the optimal coupling position, at a point p3 corresponding to a coupling value of $k_{opt}/\sqrt{3}$.

The curve of FIG. 3 is a theoretical curve, that is, for a given transmission system, the entire curve is not followed by the coupling positions. Indeed, two additional points are necessary to define the relation for a given transponder type.

A first point p4 corresponds to a position $k_{max}$ of maximum coupling or null distance. This position is defined by the coupling obtained when the distance separating the two antennas is minimum, that is, when the transponder is laid on the terminal (at the location spotted as being the position of inductance L1). This is not really a null distance between the two antennas, but rather a minimum distance. Indeed, antennas L1 and L2 cannot touch, due to the reader case and to the transponder case (the material coating the antenna tracks for a smart card). This position may be at any point of the characteristic of FIG. 3. It should be noted that the maximum coupling position only exceptionally corresponds to the position where the recovered voltage takes the maximum value, that is, at the optimal coupling.

A second point p5 corresponds to the system range limit. The position of point p5 varies according to the transponder structure. It is the point where the transponder looses contact for lack of power. Point p5 is, for example, determined based on standards that determine the maximum power to be transmitted by the terminal and that condition the system range. It should be noted that the lower voltage VC2(p5) at point p5, the wider the system range and the more necessary it is to decrease the field when the transponder comes close to the terminal.

According to the present invention, account is taken of the curve of FIG. 3 to control the transmission power with the distance (and thus the coupling) between the transponder and the terminal. The coupling between the oscillating circuits especially depends on current I in the series oscillating circuit of the terminal (for example, measured by transformer 23). Now, current I is linked, by the following relation, to the so-called generator voltage Vg and to apparent impedance $Z1_{app}$ of the oscillating circuit:

$$I = \frac{Vg}{Z1_{app}}. \qquad (\text{formula 1})$$

Now, apparent impedance $Z1_{app}$ is, among others, a function of resistance R1. Accordingly, the coupling, and thus voltage VC2 recovered by the transponder, can be modified by modifying either the value of Vg or the value of R1, or both.

Further, the fact of regulating the oscillating circuit phase on a reference value enables the distance variation of a transponder entering the terminal's field to only translate as a modification of the real part of the impedance of this oscillating circuit. Indeed, all variations which would tend to modify the imaginary part of this impedance by the load formed by the transponder are compensated for by the phase regulation loop. Thus, the phase control by means of the regulation system ensures that, in static operation (that is, for frequencies smaller than the sub-carrier frequency), the imaginary part of impedance $Z1_{app}$ is null. Accordingly, impedance $Z1_{app}$ becomes equal to apparent resistance $R1_{app}$ and can be expressed as:

$$Z1_{app} = R1_{app} = R1 + a^2 \frac{L2}{R2 \cdot C2}, \qquad (\text{formula 2})$$

with $$a^2 = \frac{k^2 \cdot \omega^2 \cdot L1 \cdot L2}{X2^2 + \left(\frac{L2}{R2 \cdot C2}\right)^2}, \qquad (\text{formula 3})$$

and where $\omega$ represents the pulsation, X2 represents the imaginary part of the impedance of the transponder's oscillating circuit ($X2 = \omega L2 - 1/\omega C2$), and where R2 represents the load formed by the transponder circuits on its own oscillating circuit, modeled in FIG. 1 by a resistor R2 shown in dotted lines, in parallel with inductance L2 and capacitor C2. In other words, resistor R2 represents the equivalent resistor of all the transponder circuits (microprocessor, backmodulation means, etc.), added in parallel on capacitor C2 and inductance L2. In above formula 2, the series resistance of inductance L1, which adds to the two other terms, has been neglected. It may also be considered that the value of this series resistance is, for simplification, included in the value of resistance R1.

It may be considered that, as a first approximation (at the 1rst order), imaginary part X2 of the impedance of the transponder's oscillating circuit is zero. This is due to the fact that the tuning situation is here considered and that, by construction, the transponder components are sized so that the oscillating circuit's resonance frequency corresponds to the remote supply carrier frequency.

Accordingly, by combining formulas 1, 2, and 3, the relation between coupling coefficient k and current I, voltage Vg, and resistance R1 is the following:

$$k = \sqrt{\frac{L2}{L1 \cdot R2} \cdot \left(\frac{Vg}{I} - R1\right)}. \qquad (\text{formula 4})$$

To be able to adapt the transmission frequency according to the coupling between the oscillating circuits, the instantaneous transponder position must be locatable on a curve of the type of that shown in FIG. 3. However, controlling the power by taking account of the entire curve leads to a solution that requires determining, for a given transponder family, the exact shape of this curve and storing it. Further, such a great precision in the control correction is not always necessary. Thus, according to a preferred embodiment of the present invention, the power control is performed based on linear relations deduced from a minimum number of characteristic points.

More specifically, from three to five points characteristic of the shape of voltage VC2 according to coupling k are used to define at most four linear variation ranges of the power as a function of the coupling. These five points correspond, respectively, to three characteristic points depending on coefficient $k_{opt}$ of the curve of FIG. 3, respectively p1 at $k_{opt}$, p2 at $k_{opt}\sqrt{3}$, and p3 at $k_{opt}/\sqrt{3}$, to point p4 depending on the minimum distance (on maximum coupling coefficient $k_{max}$), and to point p5 corresponding to the system range limit and to the maximum allowable transmission power of a terminal (generally determined by standards).

Figure 4:
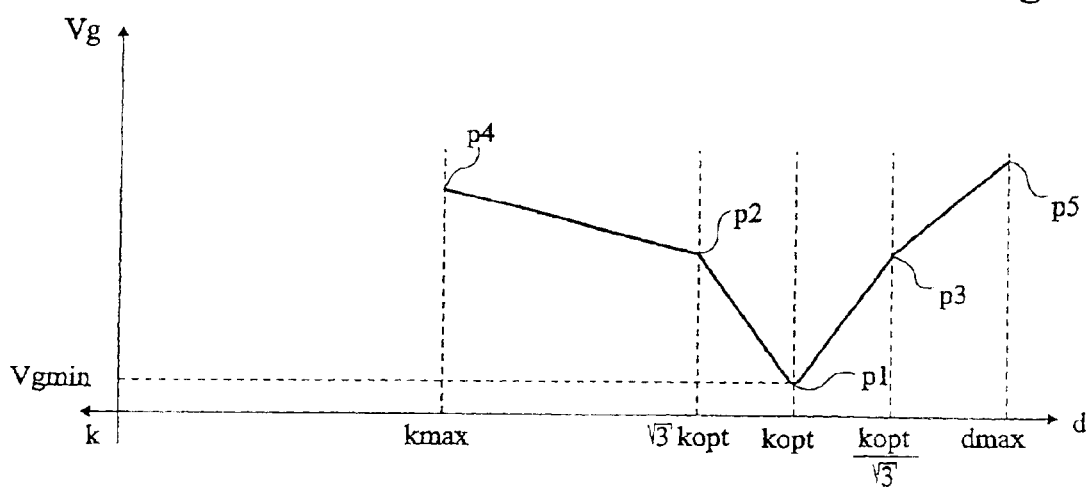
FIG. 4 shows an example of response of the control method of the present invention.

FIG. 4 shows the shape of the power correction performed, according to the present invention based on the theoretical curve of FIG. 3, as a function of the coupling.

This correction consists of modifying, as a function of coupling k, for example, voltage level Vg to maintain an approximately constant voltage level VC2 (FIG. 3). According to the present invention, this control is performed according to the position of coupling k with respect to characteristic points p1 to p5 and by linear sections between these points.

FIG. 4 is only plotted between values $k_{max}$ and $d_{max}$ corresponding to the possible ends of the characteristic. Further, the plot of FIG. 4 is based on the theoretical curve of FIG. 3 with a position of point p4 to the left of point p2.

The relation linking the voltage of generator Vg to voltage VC2 is the following:

$$VC2 = \frac{k \cdot \sqrt{\frac{L1}{L2}} \cdot R2 \cdot Vg}{R1 + k^2 \frac{L1 \cdot R2}{L2}}.$$ (formula 5)

A first solution, to be able to determine the rectilinear correction sections of FIG. 4, includes using the expression of optimal coupling coefficient $k_{opt}$ as a function of inductances L1, L2, and of resistances R1 and R2. Indeed, the relation that links optimal coupling coefficient $k_{opt}$ and the components of the oscillating circuits is the following:

$$k_{opt} = \sqrt{\frac{L2 \cdot R1}{R2 \cdot L1}}.$$ (formula 6)

By using this expression in formula 4 hereabove, the following relation enabling determination of an instantaneous coupling coefficient based on coefficient $k_{opt}$ and on the values of Vg, I, and R1 can be obtained:

$$k = k_{opt} \cdot \sqrt{\frac{Vg}{I \cdot R1} - 1}.$$ (formula 7)

Further, by combining formulas 5 and 6, the following relation can be obtained between voltage VC2 and coupling $k_{opt}$:

$$VC2 = \frac{k}{k_{opt}} \cdot \sqrt{\frac{R1}{R2}} \cdot \frac{Vg}{1 + \left(\frac{k}{k_{opt}}\right)^2}.$$ (formula 8)

Now, at optimal coupling point p1, voltage $VC2_{opt}$ is given by the following relation:

$$VC2_{opt} = \frac{Vg}{2} \cdot \sqrt{\frac{R2}{R1}}.$$ (formula 9)

By using this expression in formula 8 hereabove, voltage VC2 can be expressed according to the optimal coupling:

$$VC2 = \frac{2 \cdot VC2_{opt}}{\frac{k_{opt}}{k} + \frac{k}{k_{opt}}}.$$ (formula 10)

However, this solution is not a preferred embodiment since it poses problems of implementation. First, resistance R2 varies along the operation (as well as resistance R1 according to the control provided by the present invention). But above all, this determination is, in practice, almost impossible by learning, since the position at the optimal coupling is not easily identifiable by the terminal. Further, for a measurement of current I on the terminal side, there are two coupling coefficient possibilities according to whether the transponder is located closer to or further away from the terminal as compared to the optimal coupling position.

Thus, according to the present invention, advantage is taken from the existence of characteristic operation conditions that can be easily determined, to model the system response according to the coupling and to simplify the control.

A first condition corresponds to the off-load operation of the terminal, that is, to current $I_{off\text{-}load}$ when no transponder is present in the terminal's field. In this off-load operation, apparent impedance $Z1_{off\text{-}load}$ of the terminal's oscillating circuit now only depends on components R1, L1, and C1 of the terminal. Further, due to the phase regulation, the imaginary part of this impedance is always null. Accordingly:

$$I_{off\text{-}load} = \frac{Vg}{R1}.$$ (formula 11)

A second easily determinable condition corresponds to the maximum coupling kmax where the current measurement $I_{max}$ in the terminal's oscillating circuit can be taken while a transponder of the concerned family is laid on the terminal.

By applying formula 7 hereabove to the maximum coupling position and by incorporating therein the off-load current value according to formula 11 hereabove, the following is obtained:

$$k_{max} = k_{opt} \cdot \sqrt{\frac{I_{off\text{-}load}}{I_{max}} - 1}.$$ (formula 12)

It can thus be seen that the ratio between the optimal and maximal coefficients only depends on currents I off-load and at maximum coupling.

Further, the present inventors have determined that all functional relations of the circuit can be expressed in a particularly simple way according to ratio $k/k_{max}$. Now, determining coefficient $k_{max}$ amounts to positioning point p4 on the curve of FIG. 3, and thus to determining whether point p4 is located to the left or to the right (in the representation of FIG. 3) of optimal coupling point p1. This determination, which is simply performed by applying formula 12 hereabove, enables determining whether the considered application provides a characteristic VC2=f(k) (FIG. 3) with a slope inversion or a monotonous characteristic. Indeed, if ratio $k_{opt}/k_{max}$ is smaller than 1, the characteristic has a slope inversion. If, however, $k_{opt}/k_{max}$ is greater than 1, the characteristic is monotonous. It should be noted that, in this latter case, the optimal coupling position cannot be achieved.

Figure 5:
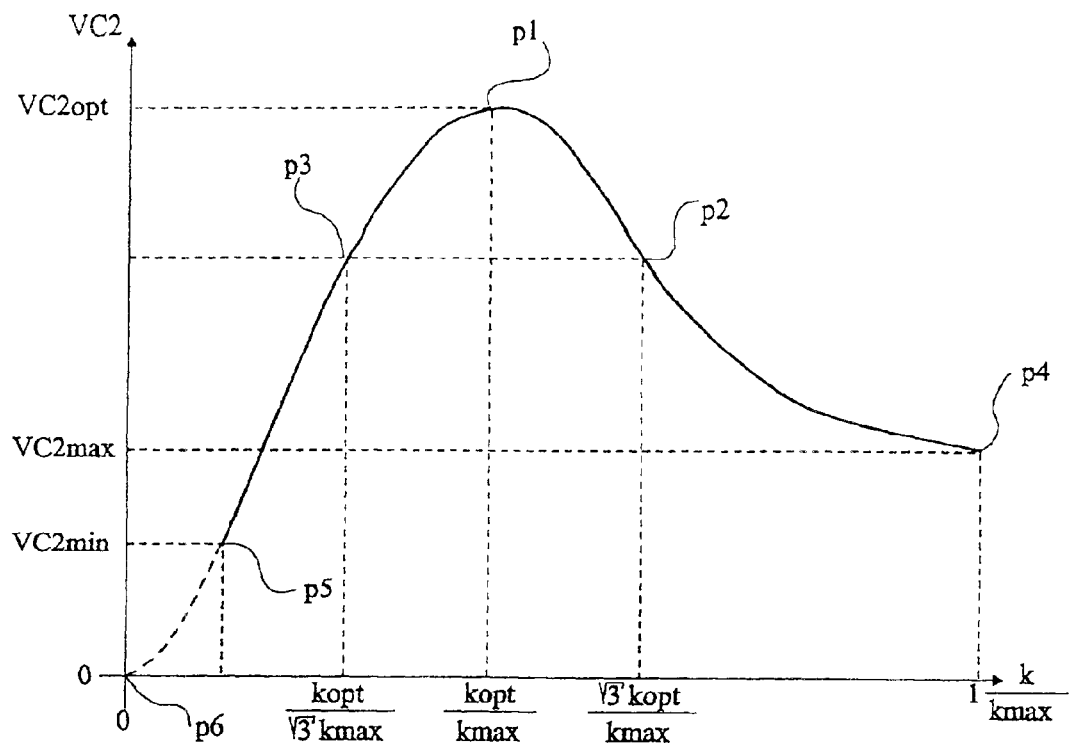
FIG. 5 shows a first example of response of a transponder in an embodiment of the present invention.

FIG. 5 shows the characteristic of voltage VC2 as a function of ratio $k/k_{max}$ for a system where $k_{opt}/k_{max}$ is smaller than one. This characteristic starts at point p5 and is thus turned over (k increasing to the right) with respect to the characteristic of FIG. 3. It should be noted that, preferably, point p5 does not correspond to the terminal off-load operation, that is, to the point with a null abscissa and ordinate in FIG. 4. Indeed, range limit point p5 corresponds to the coupling (not necessarily null) where the transponder looses contact, that is, is no longer sufficiently supplied. At maximum coupling point p4, the abscissa is 1 ($k=k_{max}$). Since ratio $k_{opt}/k_{max}$ has been determined, the abscissas of the five characteristic points p1 to p5 are known. It should be noted that the determination of point p3 is optional.

Another preferred feature of the present invention is, instead of trying to determine the absolute values of voltage VC2 at points p1 to p5, of using relative values, that is, ratios, of this voltage. Indeed, what mostly matters is to determine the correction slopes to be applied.

The following discussion enabling determination, according to the present invention, of the corrections to be brought to the transmission power according to the instantaneous coupling k is performed by considering that the voltage of generator voltage Vg is made to vary (with a constant R1). It should however be noted that quantities Vg and R1 are linked to each other as will be seen hereafter, so that this discussion can be transposed to a variation of resistance R1 (with a constant Vg).

First, it is known that voltages $VC2_{(p2)}$ and $VC2_{(p3)}$ at points p2 and p3 are linked to voltage $VC2_{opt}$ at optimal coupling point p1 by the following relation:

$$VC2_{(p2)} = VC2_{(p3)} = VC2_{opt} \cdot \frac{\sqrt{3}}{2}. \quad \text{(formula 13)}$$

Further, by applying formula 10 to maximum coupling coefficient p4, the following relation, depending on the known ratio $k_{opt}/k_{max}$ and on a value $VC2_{max}$ which can be linked, as will be seen hereafter, to the transmission power at point p1, is obtained:

$$VC2_{max} = \frac{2 \cdot VC2_{opt}}{\frac{k_{opt}}{k_{max}} + \frac{k_{max}}{k_{opt}}}. \quad \text{(formula 14)}$$

It should be noted that value $VC2_{max}$ does not correspond to the maximum value taken by voltage VC2, this maximum value being $VC2_{opt}$. It can thus be seen that the ratio between voltages VC2 at points p1 and p4 is known from the sole learning measurements. Of course, all learning determinations are performed with no control, that is, the transmission power is, during the learning, maintained at its nominal level on the terminal side (Vg and R1 are constant).

The only value, the ratio of which cannot be expressed from voltage $VC2_{opt}$ is value $VC2_{min}$ at range limit point p5. Indeed, this position depends on the minimum voltage that the transponder must receive to operate.

A first solution would be to introduce this value in the terminal to make it available for slope generation calculations when this terminal is dedicated to a transponder family.

However, according to a preferred embodiment of the present invention, it is attempted to minimize the introduction of values in the terminal and to be content with the learning. It should be noted that, at the origin p6 of curve VC2=f(k), there is no more coupling and voltage VC2 is null. Thus, according to the present invention, the slope is considered to vary little between points p6 and p3 and a single correction section is considered. It should be noted that, in a simplified embodiment, it is even considered that one correction section is enough between points p1 and p6.

Now, by applying formula 7 to the optimal coupling position and by incorporating therein the off-load current value provided by formula 11, it can be deduced that off-load current $I_{off-load}$ corresponds to twice optimal coupling current $I_{opt}$. This relation does not enable deducing therefrom a relation between voltages $VC2_{opt}$ and $VC2_{min}$. However, the excitation power is linked to current I, which is itself proportional to the adjustment parameter (formula 1), for example, voltage Vg. Accordingly, in terms of correction to be brought to control the generator voltage to maintain an approximately constant voltage VC2, it can be said that generator voltage Vg(p1) at optimal coupling point p1 (which corresponds to the minimum value Vgmin of voltage Vg) must be equal to half generator voltage Vg(p6) at off-load operation point p6. Now, as previously indicated, the maximum transmission power of the terminal (and thus the maximum generator voltage $Vg_{max}$) is known, for example by being set by standards. When the system operates off-load, voltage Vg(p6) thus cannot exceed value $Vg_{max}$. According to this embodiment of the present invention, voltage Vg(p6) is then set to a value Vgnom smaller than or equal to value $Vg_{max}$. This is enough to determine the correction functions to be applied to voltage $Vg_{nom}$ according to coupling coefficient k or to an analogous information. Indeed, the correction slopes of the curve of FIG. 4 can then be determined.

In a characteristic $Vg=f(k/k_{max})$, enabling control of voltage Vg to obtain an approximately constant nominal value of voltage VC2 recovered by a transponder, the coordinates of points p1, p2, p4, p6 and, possibly, p3, according to ratio $k/k_{max}$ and to voltage $Vg_{nom}$ can be deduced from the above discussion:

point p6 has coordinates 0 (off-load) and $Vg_{nom}$;
point p1 has coordinates $k_{opt}/k_{max}$ and $Vg_{min}=Vg_{nom}/2$;
point p2 has coordinates $\sqrt{3} \cdot k_{opt}/k_{max}$ and $Vg_{nom}/\sqrt{3}$;
point p4 has coordinates 1 (card on the terminal) and $$Vgnom \cdot \left( \frac{k_{opt}}{k_{max}} + \frac{k_{max}}{k_{opt}} \right) \bigg/ 4;$$

and possible point p3 has coordinates $k_{opt}/(\sqrt{3} \cdot k_{max})$ and $Vg^{nom}/\sqrt{3}$.

Based on these coordinates, the relations of the control characteristic according to the instantaneous value of ratio $k/k_{max}$ can be established. Taking the example illustrated in FIG. 4 where $I_{off-load}$ is greater than or equal to $I_{max}$, the following relations may for example be applied:

for $k/k_{max} < k_{opt}/(k_{max} \cdot \sqrt{3})$:

$$Vg = Vgnom \cdot \left( \frac{1}{\sqrt{3}} + \frac{1 - \frac{1}{\sqrt{3}}}{\frac{1}{\sqrt{3}}} \cdot \frac{k_{max}}{k_{opt}} \cdot \left( \frac{k_{opt}}{k_{max} \cdot \sqrt{3}} - \frac{k}{k_{max}} \right) \right);$$

for $k_{opt}/(k_{max} \cdot \sqrt{3}) < k/k_{max} < k_{opt}/k_{max}$:

$$Vg = Vgnom \cdot \left( \frac{1}{2} + \frac{\frac{1}{\sqrt{3}} - \frac{1}{2}}{\frac{1}{\sqrt{3}} - 1} \cdot \frac{k_{max}}{k_{opt}} \cdot \left( \frac{k}{k_{max}} - \frac{k_{opt}}{k_{max}} \right) \right);$$

for $k_{opt}/k_{max} < k/k_{max} < k_{opt}\sqrt{3}/k_{max}$:

-continued $$Vg = \frac{Vg_{nom}}{2} \cdot \left(1 + \frac{\frac{2}{\sqrt{3}} - 1}{\sqrt{3} - 1} \cdot \frac{k_{max}}{k_{opt}} \cdot \left(\frac{k}{k_{max}} - \frac{k_{opt}}{k_{max}}\right)\right); \text{ and}$$

for $k_{opt}\sqrt{3}/k_{max} < k/k_{max}$:

$$Vg = Vgnom \cdot$$

$$\left(\frac{1}{\sqrt{3}} + \frac{\sqrt{3} \cdot \left(\frac{k_{opt}}{k_{max}} + \frac{k_{max}}{k_{opt}}\right) - 4}{4\sqrt{3}\left(1 - \frac{k_{opt}}{k_{max}} \cdot \sqrt{3}\right)} \cdot \left(\frac{k}{k_{max}} - \frac{k_{opt} \cdot \sqrt{3}}{k_{max}}\right)\right).$$

It should be noted that the first and second sections hereabove can be united in a single one. In this case:

for $k/k_{max} < k_{opt}/k_{max}$:

$$Vg = \frac{Vg_{nom}}{2} \cdot \left(1 + \frac{k_{max}}{k_{opt}} \cdot \left(\frac{k_{opt}}{k_{max}} - \frac{k}{k_{max}}\right)\right).$$

Of course, the circuit implementing this correction, be it a network of switchable resistors or one or several MOSFET transistors, the on-state resistance of which is made to vary, will have to take account of the power levels at the coefficient change points to respect a continuous correction over the entire operating range.

In the example of FIG. 5, a specific case is that where point p5 is at a voltage level VC2 greater than that of point p4. In practice, this means that the transponder only receives a sufficient power in a distance range excluding hyperproximity, that is, a coupling relation where it is very close to the terminal. In other words, the system has, close to the terminal, an area in which the transponder cannot receive a sufficient power supply. In such a case, during the learning phase, the reader finds out that the current that it measures in the position where the operator indicates that a transponder is laid on the reader corresponds to the off-load current. In other words, it does not detect the transponder. It may be provided for the learning system to ask the operator, in this case, to progressively move the transponder away until it detects it. This position is then taken as the maximum coupling position p4.

As indicated previously, coefficient $k_{max}$ can be located anywhere on the characteristic of FIG. 3.

Figure 6:
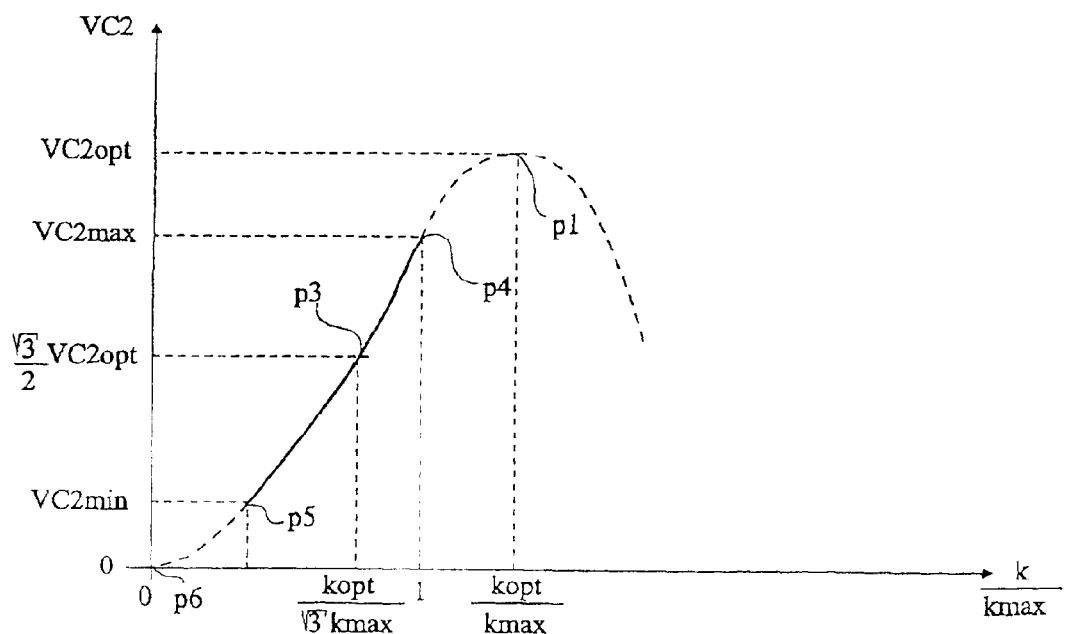
FIG. 6 shows a second example of response of a transponder in an embodiment of the present invention.

FIG. 6 shows characteristic VC2=f(k/$k_{max}$) in the case where it is monotonous, that is, in the case where the learning has determined that current $I_{off-load}$ is smaller than twice current $I_{max}$ (see formula 12 hereabove). This means, in particular, that the optimal coupling position (p1 in dotted lines in FIG. 6) is never passed. In this case, the correction of nominal value $Vg_{nom}$ includes two sections (if, as shown, point p3 is between points p5 and p4), or even a single section (if point p4 is reached before point p3), which can be deduced from what has been discussed hereabove in relation with FIG. 5. Indeed, all the previously-discussed formulas remain valid.

In the case where $k_{opt}/k_{max}$ is greater than $\sqrt{3}$, the single section is, for example:

$$Vg = Vgnom \cdot \left(\frac{\frac{k_{opt}}{k_{max}} + \frac{k_{max}}{k_{opt}}}{4} + \left(\frac{\frac{k_{opt}}{k_{max}} + \frac{k_{max}}{k_{opt}}}{4} - 1\right) \cdot \left(\frac{k}{k_{max}} - 1\right)\right).$$

In the case where $k_{opt}/k_{max}$ is smaller than $\sqrt{3}$, one may establish, for example:

for $k/k_{max} < k_{opt}/(k_{max}\sqrt{3})$:

$$Vg = Vgnom \cdot \left(\frac{1}{\sqrt{3}} + \frac{1 - \frac{1}{\sqrt{3}}}{\frac{1}{\sqrt{3}}} \cdot \frac{k_{max}}{k_{opt}} \cdot \left(\frac{k_{opt}}{k_{max} \cdot \sqrt{3}} - \frac{k}{k_{max}}\right)\right);$$

and for $k/k_{max} > k_{opt}/(k_{max}\sqrt{3})$:

$$Vg = Vgnom \cdot$$

$$\left(\frac{\frac{k_{opt}}{k_{max}} + \frac{k_{max}}{k_{opt}}}{4} + \frac{\frac{1}{\sqrt{3}} - \frac{\frac{k_{opt}}{k_{max}} + \frac{k_{max}}{k_{opt}}}{4}}{\frac{k_{opt}}{k_{max} \cdot \sqrt{3}} - 1} \cdot \left(\frac{k}{k_{max}} - 1\right)\right).$$

Finally, in the specific case where $k_{opt}=k_{max}$, the two above sections become:

for $k/k_{max} < 1/\sqrt{3}$:

$$Vg = Vgnom \cdot \left(\frac{1}{\sqrt{3}} + \frac{1 - \frac{1}{\sqrt{3}}}{\frac{1}{\sqrt{3}}} \cdot \left(\frac{1}{\sqrt{3}} - \frac{k}{k_{max}}\right)\right); \text{ and}$$

for $k/k_{max} > 1/\sqrt{3}$:

$$Vg = Vgnom \cdot \left(\frac{1}{2} + \frac{\frac{1}{\sqrt{3}} - \frac{1}{2}}{\frac{1}{\sqrt{3}} - 1} \cdot \left(\frac{k}{k_{max}} - 1\right)\right).$$

It should be noted that, although this is not mentioned, all the above relations of Vg=f(k/$k_{max}$) are of course valid at the end points of the sections.

It should also be noted that in all cases, off-load current $I_{off-load}$ must, during the learning phase, be greater than or equal to the maximum coupling current $I_{max}$, a smaller off-load current being an impossible case.

Once the learning phase is over (measurements of $I_{off-load}$ and $I_{max}$, or VC1$_{off-load}$ and VC1$_{max}$, and calculation of the coordinates and slope of characteristics Vg=f(k/$k_{max}$)), the terminal is ready to operate by controlling the excitation power according to the coupling. For this purpose, the terminal measures (at regular longer or shorter time intervals according to the time required to exploit the measurements and to the desired response time) current I in its oscillating circuit and voltage VC1 across capacitor C1 (element 24) of this circuit. According to the present invention, these sole measurements are sufficient to adapt generator voltage Vg (or, as an alternative, the value of resistance R1).

Indeed, it is known that imaginary part X1$_{app}$ of apparent impedance Z1$_{app}$ can be expressed as:

$$X1_{app}=X1-a2 \cdot X2, \quad \text{(formula 15)}$$

with:

$$X1 = \omega \cdot L1 - \frac{1}{\omega \cdot C1}. \quad \text{(formula 16)}$$

Now, due to the phase regulation, imaginary part $X1_{app}$ is null. Accordingly:

$$X1 = a2 \cdot X2. \quad \text{(formula 17)}$$

The difference between the instantaneous and off-load values can be expressed in the following way:

$$X1 - X1_{off\text{-}load} = a^2 \cdot X2 - a_{off\text{-}load}^2 \cdot X2. \quad \text{(formula 18)}$$

Now, the coefficient $a_{off\text{-}load}$ corresponding to the value at point p6 is null (coupling koff-load is null). Further, voltage VC1 across element 24 (neglecting the influence of intensity transformer 23) can be written as $I/\omega C1$, I being, for example, measured by transformer 23. As a result, formula 18 hereabove can be written as:

$$a2 \cdot X2 = \frac{VC1_{off\text{-}oad}}{I_{off\text{-}load}} - \frac{VC1}{I}. \quad \text{(formula 19)}$$

By expressing the ratio of the expressions of formula 18 applied to the instantaneous value and to the maximum coupling, and by replacing them in formula 19 hereabove, one may write:

$$\frac{a^2 \cdot X2}{a_{max}^2 \cdot X2} = \frac{\dfrac{VC1_{off\text{-}load}}{I_{off\text{-}load}} - \dfrac{VC1}{I}}{\dfrac{VC1_{off\text{-}load}}{I_{off\text{-}load}} - \dfrac{VC1_{max}}{I_{max}}}. \quad \text{(formula 20)}$$

Now, by applying formula 3 to the above formula, one obtains:

$$\frac{a^2 \cdot X2}{a_{max}^2 \cdot X2} = \frac{k^2}{k_{max}^2}. \quad \text{(formula 21)}$$

Thus, ratio $k/k_{max}$ between the instantaneous and maximum coupling coefficients can be expressed, when a transponder is present in the terminal's field, as:

$$\frac{k}{k_{max}} = \sqrt{\frac{\dfrac{VC1_{off\text{-}load}}{I_{off\text{-}load}} - \dfrac{VC1}{I}}{\dfrac{VC1_{off\text{-}load}}{I_{off\text{-}load}} - \dfrac{VC1_{max}}{I_{max}}}}. \quad \text{(formula 22)}$$

Now, the values of current I and of voltage VC1 off-load and at maximum coupling have been measured during the learning phase. Accordingly, it is enough to measure the current I and VC1 to determine ratio $k/k_{max}$ and apply one of the functions $Vg=f(k/k_{max})$ described hereabove, according to whether the system has been determined upon learning as having a monotonous response or not.

The implementation of the present invention uses the digital terminal control circuits in that it is necessary to store measurements and perform calculations on these measurements. These circuits, which have not been detailed in FIG. 2, are comprised in block 4 of FIG. 1. Dedicated calculators formed in wired logic or, to benefit from adaptation capacities, software means programming a microprocessor of block 4 may be used.

It should be noted that other means may be used to bias a variable capacitive element 24. What matters is to have an information proportional to the phase regulation control.

By applying the previously-discussed learning and determination method, current I in the oscillating circuit is measured (by means of transformer 23) both off-load and by laying a transponder on the terminal to be at maximum coupling. Values $I_{off\text{-}load}$ and $I_{max}$ are obtained and stored at the same time as the corresponding values $VC1_{off\text{-}load}$ and $VC1_{max}$. It should thus be noted that, although reference has been made, for clarity, to the value of coupling coefficient k, it may actually be the quantities on which it depends. These quantities can then be processed directly by replacing coupling k by its expression as a function of these quantities in the above-discussed formulas.

An advantage of the present invention is that it enables adapting the transmission power of the reader to the transponder position. The power consumption of the reader can then be optimized by being reduced when a transponder is located close to the optimal coupling. The system range is also optimized by enabling a high power transmission when a transponder is far away from the terminal without risking damaging it since this power is decreased as the transponder comes close to the terminal.

Another advantage of the present invention is that it overcomes the problems due to the non-monotonous response of a transponder according to the coupling.

Another advantage of the present invention is that a read terminal that can be adapted to different transponder families can be provided, be it upon manufacturing, upon installation, or in an on-the-spot operation. It is enough, for this purpose, to use the computer means generally present in the terminal and to provide a program for configuring this terminal to a given transponder family.

Another advantage of the present invention is that it is independent from the transponder. Indeed, no structural modification of a transponder is necessary to implement the present invention. Accordingly, a read terminal of the present invention can be used with conventional transponders.

Of course, the present invention is likely to have various alterations, modifications, and improvements which will readily occur to those skilled in the art. In particular, the practical implementation of the selection circuit (25, FIG. 2) and of the means of automatic determination of the quantities necessary to implement the present invention are within the abilities of those skilled in the art according to the application and to the functional indications given hereabove. Further, it should be noted that other types of variable capacitive elements may be used, provided that the use of the information provided by the phase regulation loop to set this variable capacitive element is respected.

Among the applications of the present invention, readers (for example, access control terminals or porticoes, automatic dispensers, computer terminals, telephone terminals, televisions or satellite decoders, etc.) of contactless chip cards (for example, identification cards for access control, electronic purse cards, cards for storing information about the card holder, consumer fidelity cards, toll television cards, etc.) will more particularly be pointed out.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A terminal for generating an electromagnetic field adapted to cooperating with at least one transponder when the at least one transponder is within said electromagnetic field and including an oscillating circuit adapted to receiving a high frequency A.C. excitation voltage, including:
   means for maintaining a constant phase relationship between a signal in the oscillating circuit and a reference signal;
   means for determining an instantaneous information relative to an instantaneous magnetic coupling between the transponder and the terminal; and
   means for adapting a power of the electromagnetic field according to at least said instantaneous information.

2. The terminal of claim 1, including means for measuring a first quantity which is a function of an instantaneous voltage across a capacitive element of said oscillating circuit and a second quantity which is a function of an instantaneous current in said oscillating circuit.

3. The terminal of claim 2, including means for determining and storing characteristic information relative to a magnetic coupling between the transponder and the terminal in several determined configurations of a distance separating the transponder from the terminal, and for taking account said characteristic information in the adaptation of the electromagnetic field power.

4. The terminal of claim 3, wherein said characteristic information includes, among others:
   a voltage across the capacitive element when no transponder is present in the electromagnetic field of the terminal;
   a voltage across the capacitive element when a transponder is in a relation of maximum closeness with the terminal;
   a current in the oscillating circuit when no transponder is present in the field of the terminal; and
   a current in the oscillating circuit when a transponder is in a relation of maximum closeness with the terminal.

5. The terminal of claim 3, wherein said instantaneous information is deduced from respective values of said two quantities and of respective values of said characteristic information.

6. The terminal of claim 3, wherein at least one characteristic information is automatically determined by the terminal in a learning phase.

7. The terminal of claim 1, wherein the means for adapting the power of the electromagnetic field includes means controllable to modify the A.C. excitation voltage of the oscillating circuit of the terminal.

8. The terminal of claim 1, wherein the means for adapting the power of the electromagnetic field include one or more controllable resistive elements, belonging to the oscillating circuit of the terminal.

9. The terminal of claim 1, wherein a response time of the means for maintaining is chosen to be large as compared to a frequency of a possible back-modulation coming from a transponder present in the electromagnetic field of the terminal and to be fast as compared to a displacement speed of a transponder in this electromagnetic field.

10. The terminal of claim 1, wherein said oscillating circuit includes an element of variable capacitance, said terminal including means adapted to determining a value of this capacitance based on a phase measurement on the signal in the oscillating circuit by varying a voltage across the element of variable capacitance.

11. The method of claim 1, wherein the terminal further includes:
    an oscillator to provide an excitation signal to the oscillating circuit, and
    wherein the reference signal corresponds to the excitation signal.

12. The method of claim 1, wherein the means for maintaining a constant phase relationship is operative to maintain a constant relationship between a phase of a current in the oscillating circuit and a phase of the reference signal.

13. A terminal for generating an electromagnetic field, the terminal being adapted to cooperate with a transponder when the transponder is within the electromagnetic field, the terminal comprising:
    an oscillating circuit; and
    a phase regulating circuit to maintain a constant phase relationship between a current in the oscillating circuit and a reference signal.

14. The system of claim 13, wherein the transponder imposes a load on the oscillating circuit when the transponder is within the electromagnetic field, the imposed load impacting an impedance of the oscillating circuit and
    wherein the phase regulation circuit is operative to compensate for an imaginary part of the imposed load so that an imaginary part of the impedance of the oscillating circuit is null.

15. The terminal of claim 13, further comprising:
    an oscillator to provide an excitation signal to the oscillating circuit,
    wherein the reference signal corresponds to the excitation signal.

16. The terminal of claim 13, further comprising:
    a control unit to control a substantially linear modification of a power transmitted by the terminal based on a distance between the transponder and the terminal.

17. The terminal of claim 16, wherein the control unit is operative to control modification of the power transmitted by the terminal by controlling modification of a value of a resistive element in the terminal.

18. The terminal of claim 16, wherein the control unit is operative to control modification of the power transmitted by the terminal by controlling modification of a value of a voltage generated by the terminal.

19. The terminal of claim 16, wherein the control unit is operative to evaluate a distance between the transponder and the terminal according to phase correction information provided by the phase regulating circuit.

20. The terminal of claim 19, wherein the phase correction information includes a voltage across a capacitive element of the oscillating circuit.

21. The terminal of claim 13, where the phase regulating circuit is operative to detect a phase interval between a current in the oscillating circuit and the reference signal and to modify a capacitance of the oscillating circuit in response to the phase interval.

22. The terminal of claim 13, further comprising:
    a current measurement circuit to measure a value of the current in the oscillating circuit and to provide the measured value to the phase regulating circuit.

23. The terminal of claim 13, further comprising:
    a storage element to store measurement values corresponding to at least two conditions, the measurement values being acquired during a learning phase of operation of the terminal.

24. The terminal of claim 23, wherein the measurement values include:
- a first value of the current in the oscillating circuit corresponding to a first condition wherein the transponder is maximally close to the terminal; and
- a second value of the current in the oscillating circuit corresponding to a second condition wherein no transponder is present in the electromagnetic field of the terminal.

25. A method of controlling a power of an electromagnetic field generated by an oscillating circuit of a terminal adapted to cooperate with a transponder when the transponder is within the electromagnetic field, the method comprising an act of:
- (A) maintaining a constant phase relationship between a current in the oscillating circuit and a reference signal.

26. The system of claim 25, wherein the transponder imposes a load on the oscillating circuit when the transponder is within the electromagnetic field, the imposed load impacting an impedance of the oscillating circuit and
- wherein the phase regulation circuit is operative to compensate for an imaginary part of the imposed load so that an imaginary part of the impedance of the oscillating circuit is null.

27. The method of claim 25, the terminal further comprising an act of:
- (B) providing an excitation signal to the oscillating circuit,
- wherein the reference signal corresponds to the excitation signal.

28. The method of claim 25, further comprising an act of:
- (B) evaluating a distance between the terminal and a transponder in the electromagnetic field of the terminal; and
- (C) modifying the power of the electromagnetic field based on the distance between the terminal and a transponder.

29. The method of claim 28, wherein the act (C) includes modifying a value of a resistive element of the terminal.

30. The method of claim 28, wherein the act (C) includes modifying a value of a voltage generated by the terminal.

31. The method of claim of claim 28, wherein the act (B) comprises evaluating the distance between the terminal and the transponder according to phase correction obtained during the act (A).

32. The method of claim of claim 25, wherein the act (A) includes acts of:
- detecting a phase interval between the current in the oscillating circuit and the reference signal; and
- modifying a capacitance of the oscillating circuit based on the phase interval.

33. The method of claim 25, wherein the act (A) includes obtaining phase correction information that includes a voltage across a capacitive element of the oscillating circuit.

34. The method of claim 25, wherein the act (A) includes measuring the current in the oscillating circuit.

35. The method of claim 25, further comprising, during a learning phase of operation of the terminal, acts of:
- (B) measuring values of the current corresponding to at least two conditions; and
- (C) storing the values in a storage element of the terminal.

36. The method of claim 35, wherein the act (B) includes:
- measuring the current in the oscillating circuit when the transponder is maximally close to the terminal; and
- measuring the current when there is no transponder present in the electromagnetic field of the terminal.

* * * * *

UNITED STATES PATENT AND TRADEMARK OFFICE
CERTIFICATE OF CORRECTION

PATENT NO. : 6,960,985 B2
DATED : November 1, 2005
INVENTOR(S) : Luc Wuidart

It is certified that error appears in the above-identified patent and that said Letters Patent is hereby corrected as shown below:

Column 17,
Formulas 20 and 21, should read:

$$\frac{a^2 \cdot X2}{a_{max}^2 \cdot X2} = \frac{\frac{VC1_{off-load}}{I_{off-load}} - \frac{VC1}{I}}{\frac{VC1_{off-load}}{I_{off-load}} - \frac{VC1_{max}}{I_{max}}} . \quad \text{(formula 20)}$$

$$\frac{a^2 \cdot X2}{a_{max}^2 \cdot X2} = \frac{k^2}{k_{max}^2} . \quad \text{(formula 21)}$$

Column 20,
Line 53, should read:
-- 21. The terminal of claim 13, wherein the phase regulating --.

Signed and Sealed this

Twenty-third Day of May, 2006

JON W. DUDAS
*Director of the United States Patent and Trademark Office*

UNITED STATES PATENT AND TRADEMARK OFFICE
CERTIFICATE OF CORRECTION

PATENT NO. : 6,960,985 B2 Page 1 of 1
APPLICATION NO. : 09/770783
DATED : November 1, 2005
INVENTOR(S) : Luc Wuidart It is certified that error appears in the above-identified patent and that said Letters Patent is hereby corrected as shown below:

Claim 11, col. 20, line 1 should read:
--The terminal of claim 1, wherein the terminal further--

Claim 14, col. 20, line 21 should read:
--The terminal of claim 13, wherein the transponder--

Signed and Sealed this

Twelfth Day of December, 2006

JON W. DUDAS
*Director of the United States Patent and Trademark Office*